United States Patent [19]

Shoji

[11] 3,783,887
[45] Jan. 8, 1974

[54] SELF-CLOSING VALVE DEVICE IN A PIPING SYSTEM OF FLUIDS

[75] Inventor: Akira Shoji, Tokyo, Japan

[73] Assignee: Nippon Automation Kiki Co., Ltd., Tokyo, Japan

[22] Filed: May 24, 1972

[21] Appl. No.: 256,528

[30] Foreign Application Priority Data
June 23, 1971  Japan.............................. 46/45437

[52] U.S. Cl..................................... 137/38, 251/65
[51] Int. Cl............................................ F16k 17/36
[58] Field of Search ................. 137/38, 39, 46, 456

[56] References Cited
UNITED STATES PATENTS
2,812,770  11/1957  Sullivan ............................... 137/39
3,087,761  4/1963  Stelzer ............................. 137/38 X
3,227,171  1/1966  Woelfel............................ 137/456 X Primary Examiner—Robert G. Nilson
Attorney—Roberts B. Larson et al.

[57] ABSTRACT

A self-closing valve device in a piping system of fluids comprising : a permanent magnet provided in the upper part of a valve chamber, a globe valve member hanging down attracted by said permanent magnet, an inlet pipe for a fluid being connected to a primary side including an upper portion of the valve chamber and a piston in a control cylinder, an outlet pipe for a fluid located at the bottom of said valve chamber and adapted to close by fall of said globe valve member, said outlet pipe being connected to a secondary side of said control cylinder, and a shut-off valve disposed in a piping system connecting the inlet pipe to the outlet pipe, said shut-off valve being closed by pressure difference of a fluid through transmission means combined with the piston in the control cylinder.

8 Claims, 4 Drawing Figures

SELF-CLOSING VALVE DEVICE IN A PIPING SYSTEM OF FLUIDS

BACKGROUND OF THE INVENTION

This invention relates to a self-closing valve device employable in a piping system of various kinds of dangerous fluids such as gas, oil, etc. More particularly, it relates to a device which can automatically shut off the piping system at a predetermined degree of vibration such as resulting from an earthquake or a serious disaster.

In daily life, an earthquake may occur while various gas or oil applicances are used, where it has been taught imperative to shut off the auxiliary or source cocks of gas or oil to promptly stop the flow of poisonous or dangerous gas or oil.

However, once a severe earthquake or like disaster occurs and houses are at the instant of destruction, people will lose themselves and make a frantic effort to escape paying no attention to the gas or oil applicances and this would cause the disaster of fire.

The self-closing valve device according to the present invention can meet such emergency by automatically shutting off the piping system where gas, oil or like dangerous fluid folws when a serious disaster such as an earthquake occurs. Then, by use of the device of the invention, people can escape safely to outside without care to the gas or oil appliances installed in the houses.

A primary object of the invention is therefore to provide a self-closing valve device of fluids in a piping system, wherein when an earthquake or like disaster may occur during use of gas or oil applicances, the device can automatically close the piping system at a predetermined degree of vibration so as to shut off the flow of gas or oil running through the piping system and permits the person in the house to freely escape therefrom leaving gas or oil appliances being not closed.

Another object of the invention is to provide a self-closing valve device of fluids in a piping system which further includes a secondary closing device of fluids in a piping system which can more securely shut off the flow of fluid by pressure difference and prevent the fluid to flow from the outlet pipe leaking from the valve seat as a globe valve member fitted in the outlet pipe moves by later vibration following the collapse or destruction of houses, or as dusts or the like fills the space between the valve member and the valve seat.

Another object of the invention is to provide a self-closing valve device of fluids in a piping system which is specially applicable to a large diameter piping system to supply large quantities of gas or oil for city and industrial use and which can prevent the flow of gas or oil from the high pressure piping system to avoid the occurrence of fire or like disasters.

A still another object of the invention is to provide a self-closing valve device of fluids in a piping system which can operate by sensing the vibration due to other disasters than earthquake or extraordinary vibration from outside, such as collision of vehicles against buildings and piping system, collapse of houses by the storm, etc., whereby the flow of dangerous fluid can be prevented to run outside the buildings.

These and other objects and advantages of the invention will be illustrated below by way of example with reference to the accompanying drawings, in which.

Figure 1:
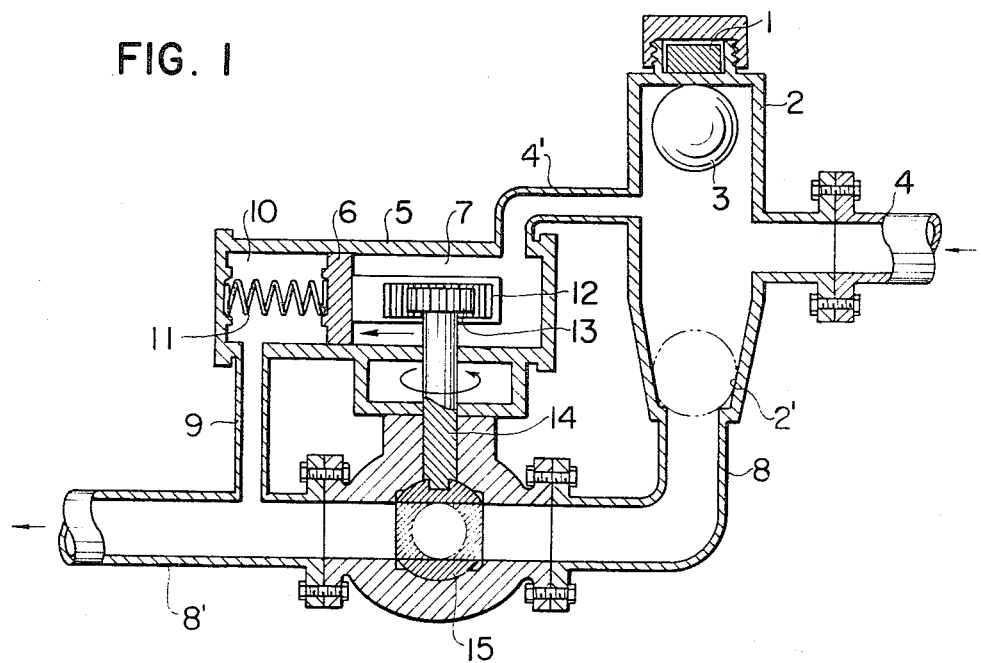
FIG. 1 is a view of the self-closing valve device according to the present invention, which is mainly applied to a piping system for home use with essential portions thereof shown in cross section.

Referring now to FIG. 1, a permanent magnet 1 is provided in the upper part of a valve casing 2 of an airtight construction. In the valve casing 2, a globe valve member 3 suspends from the upper part of the casing 2 attracted by the permanent magnet 1. Inlet pipe 4 4 for gas, oil or similar fluid is opened from supply source to the valve casing. The lead pipe 4' is communicated to a chamber on the flow inlet side (a chamber 7 on the right side of a piston 6 as shown in FIG. 1) including a piston 6 in a control cylinder 5. Below the valve casing 2 is connected an outlet nozzle 8. From outlet pipe 8' a lead pipe 9 is passed to a chamber on a flow outlet side (a chamber 10 on the left side of the piston 6 as shown in FIG. 1) 10 of the control cylinder 5.

The piston 6 in the control cylinder 5 is connected by spring 11 to the wall of the chamber on the flow outlet side as described above. A rack mechanism 12 is secured to the opposite side of the piston 6. A pinion 13 engageable with the rack mechanism 12 and a pinion bar 14 fixed to the pinion 13 are adapted in combination to move a shut-off valve 15. which is provided between the outlet nozzle 8 and outlet pipe 8'.

The above is the construction merely exemplifying the present invention. The construction may desirably be replaced with a preferred one if it can convert the reciprocal movement of the piston 6 to the rotation of the pinion bar 14.

Figure 2:
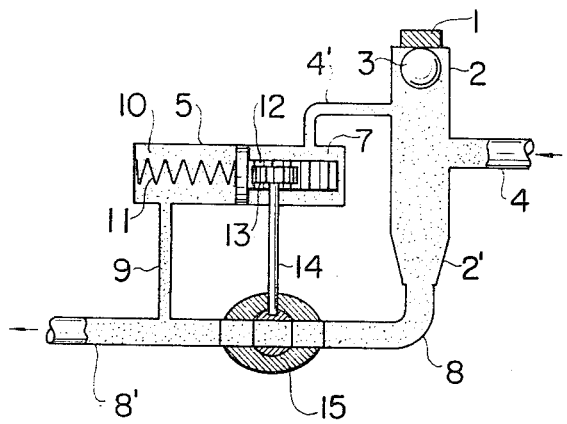
FIG. 2 is a view of the device of FIG. 1, which is applied to a piping system for ordinary use.

Operation of the self-closing valve device according to the invention will now be illustrated. Normally, as shown in FIG. 2, fluid such as gas or oil would flow through the shut off valve 15 which is usually opened in the piping system. The fluid would pass through the inlet pipe 4, valve casing 2, outlet nozzle 8, shut off valve 15, down stream pipe 8' and fills the right side and left side chambers 7, 10 therefore these parts being under approximately equal pressure.

When a serious earthquake or disaster occurs and vibration exceeding over a predetermined degree is exerted on the device, the globe valve member in the upper part of the valve casing falls off away from the permanent magnet. Thus, the globe valve member hung up by attraction on the permanent magnet falls and fits in the valve seat 2' thereby to prevent the flow of a fluid from the inlet pipe to the outlet pipe.

At this instant, pressure in the outlet pipe drops, resulting in that a pressure difference is produced between the right side chamber 7 and the left side chamber 10 control cylinder 5. The fluid pressure of the right side chamber then pushes the piston toward the direction of the arrow on FIG. 1.

Therefore, the rack mechanism 12 fixed to the piston 6 rotates at the same time, turns the pinion 13 in engagement therewith and the pinion bar 14, further rotating the shut off valve 15 connected to the pinion bar 14 to shut off the piping system for the outflow. Thus shut off valve 15 is illustrated as for example having a ball body perforated with an opening and being rotatable in 90° adapted to fully shut off the flow in the piping system. In place of the ball as above described, any form of valve mechanism can efficiently shut off the piping system if the valve mechanism employed therein may conform to the requirement of the present invention.

Figure 3:
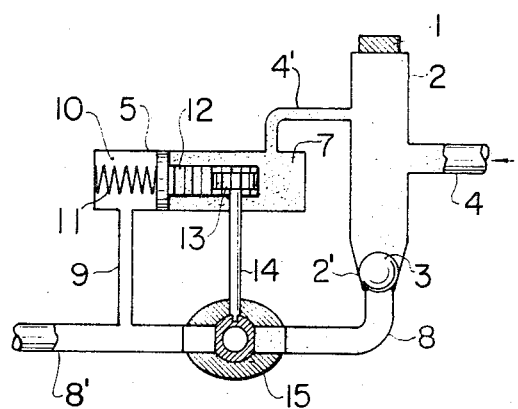
FIG. 3 is a view of the device of FIG. 1 showing its operation.

FIG. 3 illustrates the manner of a fluid prevented from flow since the shut off valve has been closed.

Figure 4:
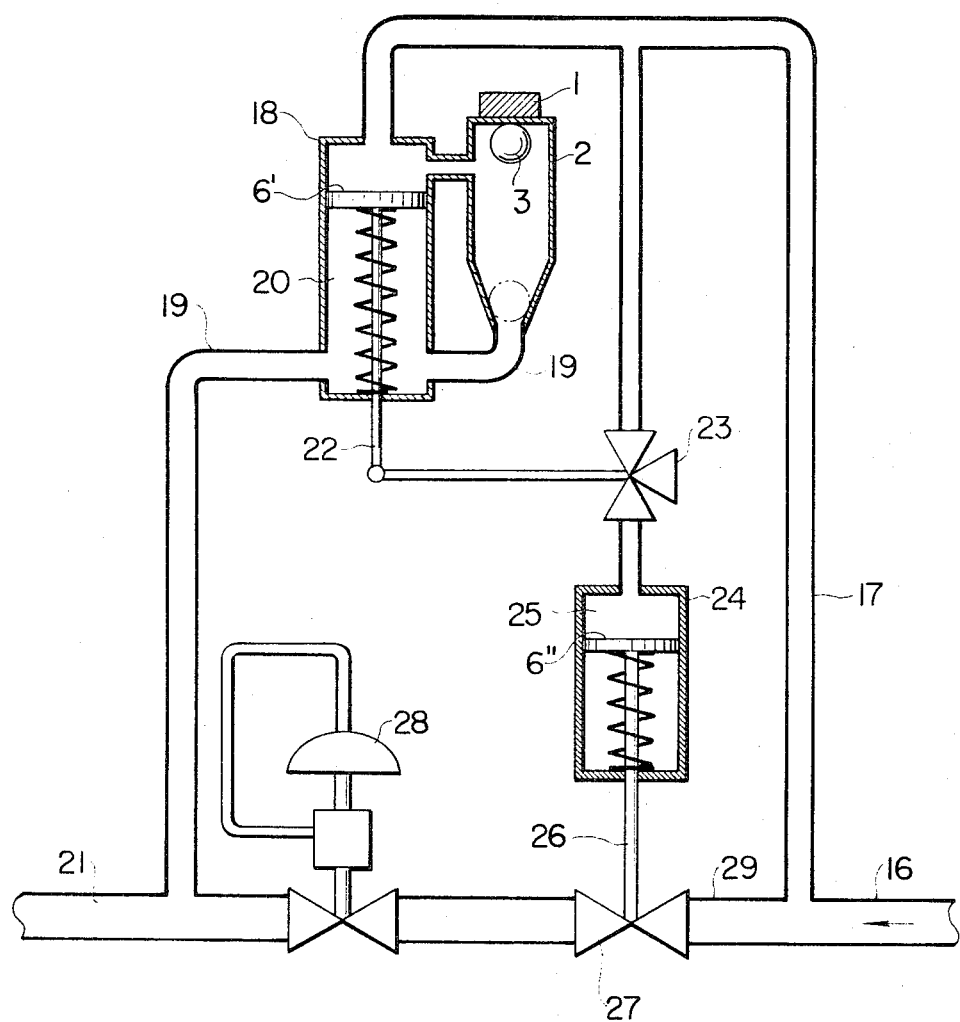
FIG. 4 is an illustrative view of the device applied to a large diameter piping system.

The embodiment of FIG. 4 shows a piping system mainly used for the city and industrial gas. The piping system as illustrated includes a high pressure pipe 16 diverging into a low pressure pipe 21. Between these pipings, there is provided a pressure reducing means 28 in the intermediate position of the pipings. This means is of the construction having an inlet pipe 17 diverging from a high pressure pipe 16. The branch pipe 17 passes through a chamber on the flow inlet side which includes a piston of a first control cylinder 18 passing to a valve chamber 2. An outlet pipe 19 is connected to a low pressure pipe 21 through a chamber 20 on the flow outlet side of the first control cylinder 18. The piston 6' of the first control cylinder 18 is communicated through linking means 22 to a three way valve 23 in an extension from a branch pipe of the inlet pipe 17. The gas that flows from the branch pipe 17 is introduced into the primary side 25 having a piston in the second control cylinder 24. There is provided a connection means 26 in this cylinder, which is connected to a shut off valve 27 in the main stream pipe 29. Normally, high pressure gas passes through the first control cylinder 18 and valve chamber 2 to the low pressure side. Therefore, a chamber on the flow inlet side and a chamber on the flow outlet side of the first control cylinder 18 are exerted approximately equal pressure. When a sudden vibration causes the globe valve member 3 to fall and fill in the outlet pipe 19, pressure of a chamber on the flow inlet side side of the first control cylinder 18 is not lowered but the pressure at a chamber on the flow outlet side of the first control cylinder drops. Consequent pressure difference causes the piston 6' actuate to open the three way valve 23, whereby gas flows into a chamber on the flow inlet side of the second control cylinder 24 to actuate the piston 6'' to close the shut off valve 27.

The advantage of the device of this embodiment is that it can more efficiently be applied to a large diameter piping system with sure interrupting effect of flow of fluids.

What is claimed is:

1. A self-closing valve device in a piping system of fluids comprising: a permanent magnet provided in the upper part of a valve chamber, a globe valve member suspended in said chamber and attracted by said permanent magnet, a fluid inlet pipe communicating with an upper portion of the valve chamber and one side of a piston in a control cylinder, a fluid outlet located at the bottom of said valve chamber and adapted to be closed by fall of said globe valve member, an outlet pipe communicating with said outlet and the other side of said control cylinder, and a shut-off valve disposed in a part of the piping system communicating said inlet pipe with said outlet pipe, said shut-off valve being closed through transmission means combined with the piston in the control cylinder.

2. Apparatus as claimed in claim 1 wherein said globe valve member and said shut-off valve are in series in the same fluid flow path.

3. Apparatus as claimed in claim 1 wherein said globe valve member and said shut-off valve are located in parallel in separate fluid flow paths.

4. Apparatus as claimed in claim 1 wherein said transmission means comprises a fluid motor controlled by a valve actuated by said piston.

5. Apparatus as claimed in claim 1 wherein said other side of said control cylinder communicates with said outlet pipe downstream of said shut-off valve.

6. A self-closing valve device in a piping system of fluids comprising: a permanent magnet provided in the upper part of a valve chamber, a globe valve member suspended in said chamber and attracted by said permanent magnet, a first control cylinder having first and second sides separated by a piston, and inlet pipe connected from a high pressure main pipe to said first side and the valve chamber, an outlet pipe at the bottom of said valve chamber and connected to a low pressure side of the main piping and the second side of said first control cylinder, the piston of said first control cylinder being connected through linking means to a valve provided in inlet piping from a high pressure side of the main piping, the piping connected to said valve being connected to one side of a second control cylinder having a second piston, and linking means coupled with said second piston for actuating a shut-off valve in the main piping.

7. Apparatus as claimed in claim 6 wherein said outlet pipe at the bottom of said valve chamber is connected to a low pressure side of the main piping through said second side of said first control cylinder.

8. Apparatus as claimed in claim 6 wherein said valve provided in inlet piping from a high pressure side of the main piping comprises a three-way valve.

* * * * *